United States Patent
Väre et al.

(10) Patent No.: US 8,498,272 B2
(45) Date of Patent: Jul. 30, 2013

(54) PROVIDING SIGNALING INFORMATION AND PERFORMING A HANDOVER USING THE SIGNALING INFORMATION

(75) Inventors: Jani Petteri Väre, Kaarina (FI); Miika Sakari Tupala, Turku (FI); Jyrki Alamaunu, Turku (FI)

(73) Assignee: Nokia Corporation (FI)

( * ) Notice: Subject to any disclaimer, the term of this patent is extended or adjusted under 35 U.S.C. 154(b) by 325 days.

(21) Appl. No.: 12/869,206

(22) Filed: Aug. 26, 2010

(65) Prior Publication Data

US 2012/0051320 A1   Mar. 1, 2012

(51) Int. Cl.
*H04W 4/00* (2009.01)

(52) U.S. Cl.
USPC ........... 370/334; 370/331; 370/332; 455/436; 455/442

(58) Field of Classification Search
None
See application file for complete search history.

(56) References Cited

U.S. PATENT DOCUMENTS

| | | | |
|---|---|---|---|
| 2006/0084435 A1 | 4/2006 | Borsos et al. | |
| 2007/0045416 A1 | 3/2007 | Paila et al. | |
| 2008/0225778 A1 | 9/2008 | Vare et al. | |
| 2009/0077585 A1 | 3/2009 | Singhai et al. | |
| 2009/0094356 A1* | 4/2009 | Vare | 709/223 |
| 2009/0103649 A1* | 4/2009 | Vare et al. | 375/295 |
| 2009/0187949 A1* | 7/2009 | Vare et al. | 725/54 |
| 2009/0203326 A1* | 8/2009 | Vesma et al. | 455/69 |
| 2009/0318151 A1 | 12/2009 | Jung et al. | |
| 2010/0083311 A1 | 4/2010 | Vare et al. | |
| 2010/0195633 A1 | 8/2010 | Vare et al. | |
| 2010/0262708 A1 | 10/2010 | Bouazizi et al. | |
| 2010/0283912 A1* | 11/2010 | Sun et al. | 348/726 |
| 2010/0299708 A1* | 11/2010 | Xu et al. | 725/54 |
| 2010/0322355 A1 | 12/2010 | Vare et al. | |
| 2011/0103300 A1* | 5/2011 | Vare et al. | 370/328 |
| 2012/0288031 A1 | 11/2012 | Vare et al. | |

FOREIGN PATENT DOCUMENTS

| | | |
|---|---|---|
| EP | 2134093 | 12/2009 |
| EP | 2154810 | 2/2010 |
| EP | 2200302 | 6/2010 |
| EP | 2207293 | 7/2010 |
| EP | 2268004 | 12/2010 |
| WO | 2011/087507 A1 | 7/2011 |

OTHER PUBLICATIONS

Faria, F., et al., DVB-H: Digital Broadcast Services to Handheld Devices, Proceedings of the IEEE, vol. 94, No. 1, pp. 194-209, Jan. 2006.

Xiaodong Y., et al., A Survey of Handover Algorithms in DVB-H, IEEE Communications Surveys & Tutorials, vol. 8, No. 44, pp. 16-29, 4th Quarter 2006.

International Search Report dated Oct. 26, 2011.

(Continued)

*Primary Examiner* — Donald Mills
(74) *Attorney, Agent, or Firm* — Banner & Witcoff, Ltd.

(57) ABSTRACT

Apparatuses may perform and methods may include: receiving a digital broadcast signal that includes layer 2 (L2) signaling information; locating a physical layer pipe (PLP) carrying local multiplex information of the L2 signaling information and a PLP carrying other multiplex information of the L2 signaling information; and extracting the local multiplex information and the other multiplex information from the respective PLPs. Apparatuses may perform and methods may include: performing a handover using the extracted other multiplex information and continuing to receive services after the performance of the handover using information included in the other multiplex information.

17 Claims, 16 Drawing Sheets

OTHER PUBLICATIONS

ETSI EN 300 468 (DVB SI), V1.11.1, Digital Video Broadcasting (DVB); Specification for Service Information (SI) in DVB Systems, Apr. 2010.

OMA-TS-BCAST Service Guide for Mobile Broadcast Services, Candidate Version 1.1—Sep. 14, 2010, 302 pages.

Handley, et al., "SDP—Session Description Protocol", IETF RFC 4566, Jul. 2006, <http://www.ietf.org/rfc/rfc4566.txt>, 46 pages.

International Search Report and Written Opinion for PCT/FI2012/050391 dated Oct. 4, 2012.

Paila, et al., "FLUTE—File Delivery over Unidirectional Transport", RFC 3926, Oct. 2004, <http://www.ietf.org/rfc/rfc3926.txt>, 33 pages.

Luby, et al., "Asynchronous Layered Coding (ALC) Protocol Instantiation", RFC 3450, Dec. 2002, <http://www.ietf.org/rfc/rfc3450.txt., 32 pages.

Luby, et al., "Layered Coding Transport (LCT) Building Block", RFC 3451, Dec. 2002, <http://www.ietf.org/rfc/rfc3451.txt>, 28 pages.

""Multimedia Broadcast/Multicast Service (MBMS); Protocols and codecs", 3rd Generation PartnershipProject, Technical Specification 3GPP TS 26.346 Release 8, <http://www.3gpp.org/ftp/Specs/>, 2 pages, Aug. 2008."

International Search Report and Written Opinion for PCT/FI2012/050521 dated Oct. 15, 2012.

ETSI TS 102 471 V1.4.1, "Digital Video Broadcasting(DVB) IP Datacast over DVB-H: Electronic Service Guide (ESG)," 139 pages, Mar. 2010.

International Search Report and Written Opinion for PCT/FI2012/050756 mailed Nov. 13, 2012.

Digital Video Broadcasting (DVB); Frame structure channel coding and modulation for a second generation digital terrestrial television broadcasting system (DVB-T2), ETSI EN 302 755 v1.1.1 (Sep. 2009), European Standard (Telecommunications series).

Digital Video Broadcasting (DVB); Transmission System for Handheld Terminals (DVB-H), ETSI EN 302 304 v1.1.1 (Nov. 2004), European Standard (Telecommunications series).

Digital Video Broadcasting (DVB); DVB specification for data broadcasting, ETSI EN 301 192 v1.5.1 (Nov. 2009), European Standard (Telecommunications series).

Digital Video Broadcasting (DVB); Framing structure, channel coding and modulation for digital terrestrial television, ETSI EN 300 744 v1.6.1 (Jan. 2009), European Standard (Telecommunications series).

Commercial Requirements for DVB-NGH DVB CM-NGH, Version 1.01, Jun. 2009, pp. 1-16.

* cited by examiner

PROVIDING SIGNALING INFORMATION AND PERFORMING A HANDOVER USING THE SIGNALING INFORMATION

BACKGROUND

Communication networks, such as a digital broadband broadcast network, enable end users to receive digital content including video, audio, data, and so forth. Using an electronic device, a user may receive digital content over a communication network, such as a wireless digital broadcast network. An electronic device, such as a mobile device, may receive a program or service in a data or transport stream. The transport stream carries individual elements of the program or service such as the audio and video components of a program or service. Typically, the electronic device locates the different components of a particular program or service in a data stream through Program Specific Information (PSI) or Service Information (SI) embedded in the data stream. However, PSI or SI signaling may be insufficient in some wireless communications systems, such as Digital Video Broadcasting-Handheld (DVB-H) systems. Use of PSI or SI signaling in such systems requires a large amount of bandwidth which is costly, decreases efficiency of the system, and may result in a sub-optimal end user experience Digital content can be transmitted in a cell within a network. A cell may represent a geographical area that may be covered by a transmitter in a communication network. A network may have multiple cells and cells may be adjacent to other cells. When a device moves between cells, a handover procedure may be initiated. Performing a handover may allow for an electronic device to continue receiving services or programs from the communication network. The processing that occurs during a handover, such as the discovery of services in the neighboring cell, may decrease the efficiency of the system and may result in a sub-optimal end user experience.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In some aspects, apparatuses may perform, methods may include, and computer readable media cause to perform at least the following: receiving a digital broadcast signal that includes layer 2 (L2) signaling information; locating a physical layer pipe (PLP) carrying local multiplex information of the L2 signaling information and a PLP carrying other multiplex information of the L2 signaling information; extracting the local multiplex information from the PLP carrying the local multiplex information of the L2 signaling information; and extracting the local multiplex information from the PLP carrying the other multiplex information of the L2 signaling information. The L2 signaling information may be carried on top of the Internet Protocol (IP) layer (e.g., in Open Systems Interconnection (OSI) layer 3).

In some aspects, apparatuses may perform, methods may include, and computer readable media may cause to perform at least the following: determining to initiate a handover; upon initiating the handover, comparing the extracted other multiplex information to handover criteria; in response to comparing the extracted other multiplex information, determining that there is one or more available handover candidate multiplexes; in response to determining that there is the one or more available handover candidate multiplexes, performing the handover to a handover multiplex of the one or more available handover candidate multiplexes; upon performing the handover to the handover multiplex, locating layer 1 (L1) signaling from a second digital broadband signal received after completion of the handover; and extracting data from a PLP carrying data for a service based on the L1 signaling and information corresponding to the handover multiplex that was included in the extracted other multiplex information.

In some aspects, apparatuses, methods, and computer readable media may include generating L1 signaling information; generating electronic service guide information; generating local multiplex information; generating other multiplex information; generating upper layer information; and causing transmission of the generated information to a receiving device.

BRIEF DESCRIPTION OF THE DRAWINGS

Certain embodiments are illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Figure 1A:
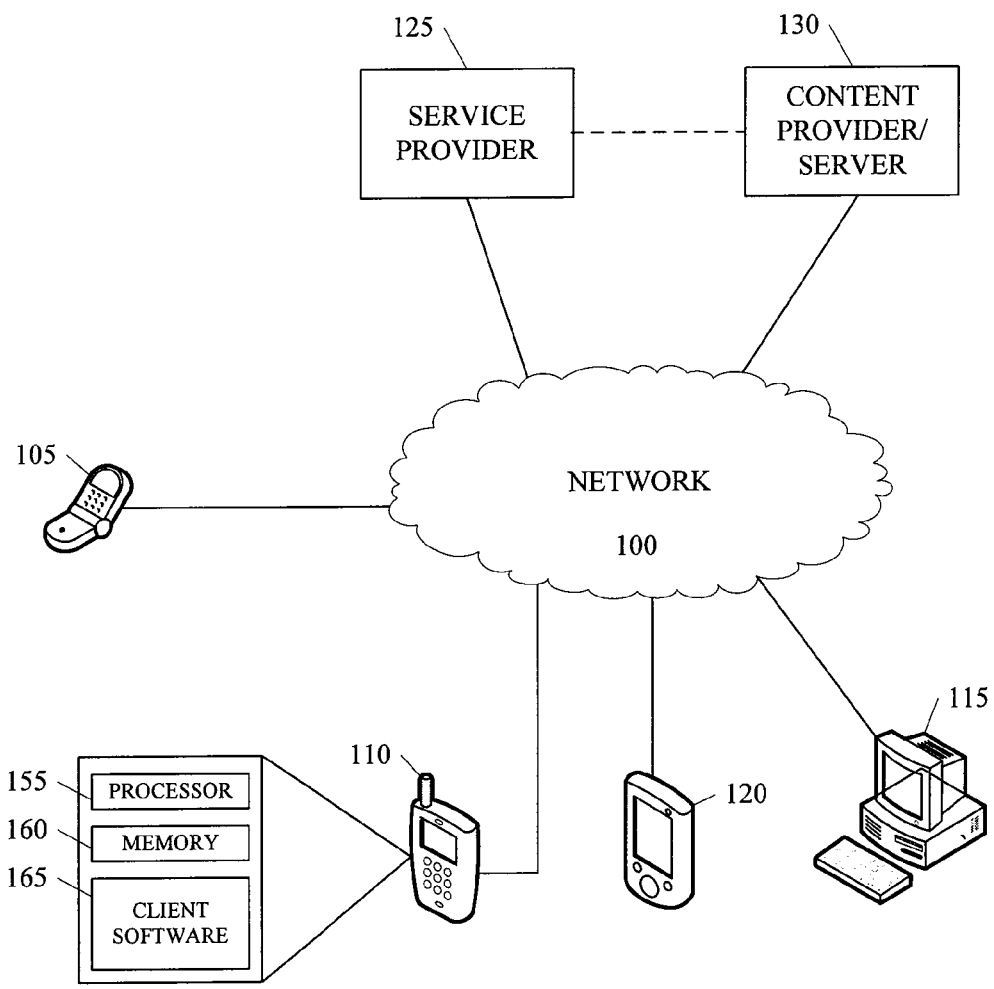
FIG. 1A is a block diagram of an example communication network in which one or more embodiments may be implemented.

FIG. 1A illustrates an example communication network through which various embodiments may be practiced. Systems, such as the systems illustrated in FIGS. 1A and 1B, may utilize a digital broadband broadcast technology, such as Digital Video Broadcast-Next Generation Handheld (DVB-NGH). Examples of other digital broadcast standards which digital broadband broadcast systems may utilize include Digital Video Broadcast-Terrestrial (DVB-T), Digital Video Broadcast-Second Generation Terrestrial (DVB-T2), Digital Video Broadcast-Handheld (DVB-H), Integrated Services Digital Broadcasting-Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Satellite Digital Multimedia Broadcasting (S-DMB), Forward Link Only (FLO), Digital Audio Broadcasting (DAB), and Digital Radio Mondiale (DRM). Other digital broadcasting standards and techniques, now known or later developed, may also be used. Aspects of the invention may also be applicable to other multicarrier digital broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast/Multicast Services) and 3GPP2 BCMCS (Broadcast/Multicast Service).

As seen in FIG. 1A, the communication network may include a number of computers and electronic devices, including mobile communication device 105, mobile phone 110, personal digital assistant (PDA) or mobile computer 120, personal computer (PC) 115, service provider 125 and content provider/server 130. The various devices of the communication network may communicate with one another and with other devices through network 100. Network 100 may include wired and wireless connections and network elements, and connections over the network may include permanent or temporary connections. Communication through network 100 is not limited to the illustrated devices and may include additional mobile or fixed devices. Such additional mobile or fixed devices may include a video storage system, an audio/video player, a digital camera/camcorder, a positioning device such as a GPS (Global Positioning System) device or satellite, a television, an audio/video player, a radio broadcasting receiver, a set-top box (STB), a digital video recorder, remote control devices and the like.

Although shown as a single network in FIG. 1A for simplicity, network 100 may include multiple networks that are interlinked so as to provide internetworked communications. Such networks may include one or more private or public packet-switched networks, for example the Internet, one or more private or public circuit-switched networks, for example a public switched telephone network, a cellular network configured to facilitate communications to and from mobile communication devices 105 and 110, for example through use of base stations, mobile switching centers, etc., a short or medium range wireless communication connection, for example Bluetooth®, ultra wideband (UWB), infrared, WiBree, wireless local area network (WLAN) according to one or more versions of Institute of Electrical and Electronics Engineers (IEEE) standard no. 802.11), or a high-speed wireless data network such as Evolution-Data Optimized (EV-DO) networks, Universal Mobile Telecommunications System (UMTS) networks, Long Term Evolution (LTE) networks or Enhanced Data rates for GSM Evolution (EDGE) networks. Devices 105-120 may use various communication protocols such as Internet Protocol (IP), Transmission Control Protocol (TCP), Simple Mail Transfer Protocol (SMTP) among others known in the art. Various messaging services such as Short Messaging Service (SMS) and/or Multimedia Message Service (MMS) may also be included.

Devices 105-120 may be configured to interact with each other or other devices, such as content provider/server 130 or service provider 125. In one example, mobile device 110 may include client software 165 that is configured to coordinate the transmission and reception of information to and from content provider/server 130. In one arrangement, client software 165 may include application or server specific protocols for requesting and receiving content from content provider/server 130. For example, client software 165 may comprise a Web browser or mobile variants thereof and content provider/server 130 may comprise a web server. Billing services (not shown) may also be included to charge access or data fees for services rendered. In one arrangement where service provider 125 provides cellular and/or wireless network access, client software 165 may include instructions for access and communication through the cellular and/or wireless network. Client software 165 may be stored in computer-readable memory 160 such as read only, random access memory, writeable and rewriteable media and removable media in device 110 and may include instructions that cause one or more components—for example, processor 155, a transceiver, and a display—of device 110 to perform various functions and methods including those described herein.

Figure 1B:
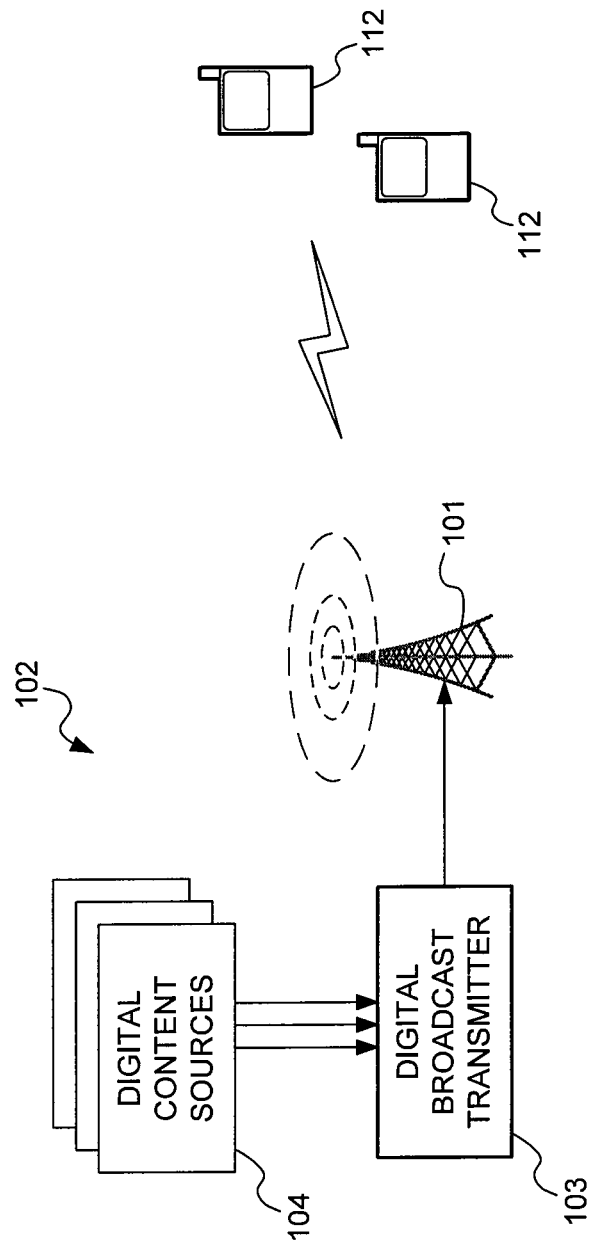
FIG. 1B is a block diagram of another example communication network in which one or more embodiments may be implemented.

FIG. 1B illustrates another example communication network through which various embodiments may be practiced. Digital content may be created and/or provided by digital content sources 104 and may include video signals, audio signals, data, and so forth. Digital content sources 104 may provide content to digital broadcast transmitter 103 in the form of digital packets, e.g., Internet Protocol (IP) packets. A group of related IP packets sharing a certain unique IP address or other source identifier is sometimes described as an IP stream. Digital broadcast transmitter 103 may receive, process, and forward for transmission multiple IP streams from multiple digital content sources 104. The processed digital content may then be passed to transmitter 101 (e.g., a digital broadcast tower), or other physical transmission component for wireless transmission. Ultimately, mobile terminals or devices 112 may selectively receive and consume digital content originating from digital content sources 104.

Figure 1C:
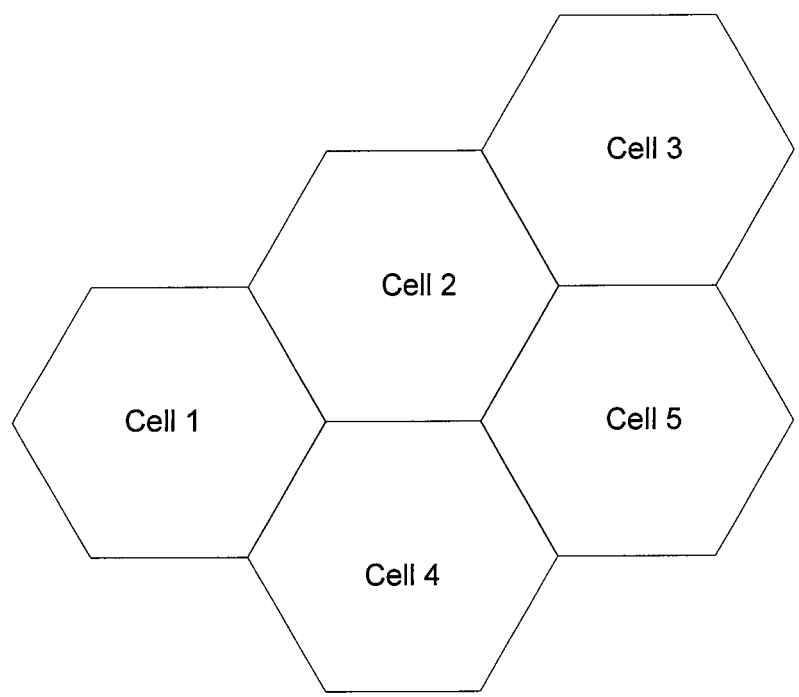
FIG. 1C illustrates an example of cells, each of which may be covered by one or more different transmitters in accordance with one or more aspects described herein.

A communication system may be comprised of a plurality of different cells. FIG. 1C illustrates an example of cells, each of which may be covered by one or more different transmitters. A cell may define a geographical area that may be covered by a transmitter. A cell may be of any size and may have neighboring cells. In this example, Cell 1 represents a geographical area that is covered by a transmitter for a communication network. Cell 2 is next to Cell 1 and represents a second geographical area that may be covered by a different transmitter. Cell 2 may, for example, be a different cell within the same network as Cell 1. Alternatively, Cell 2 may be in a network different from that of Cell 1. Cells 1, 3, 4, and 5 are neighboring cells of Cell 2, in this example.

Figure 2:
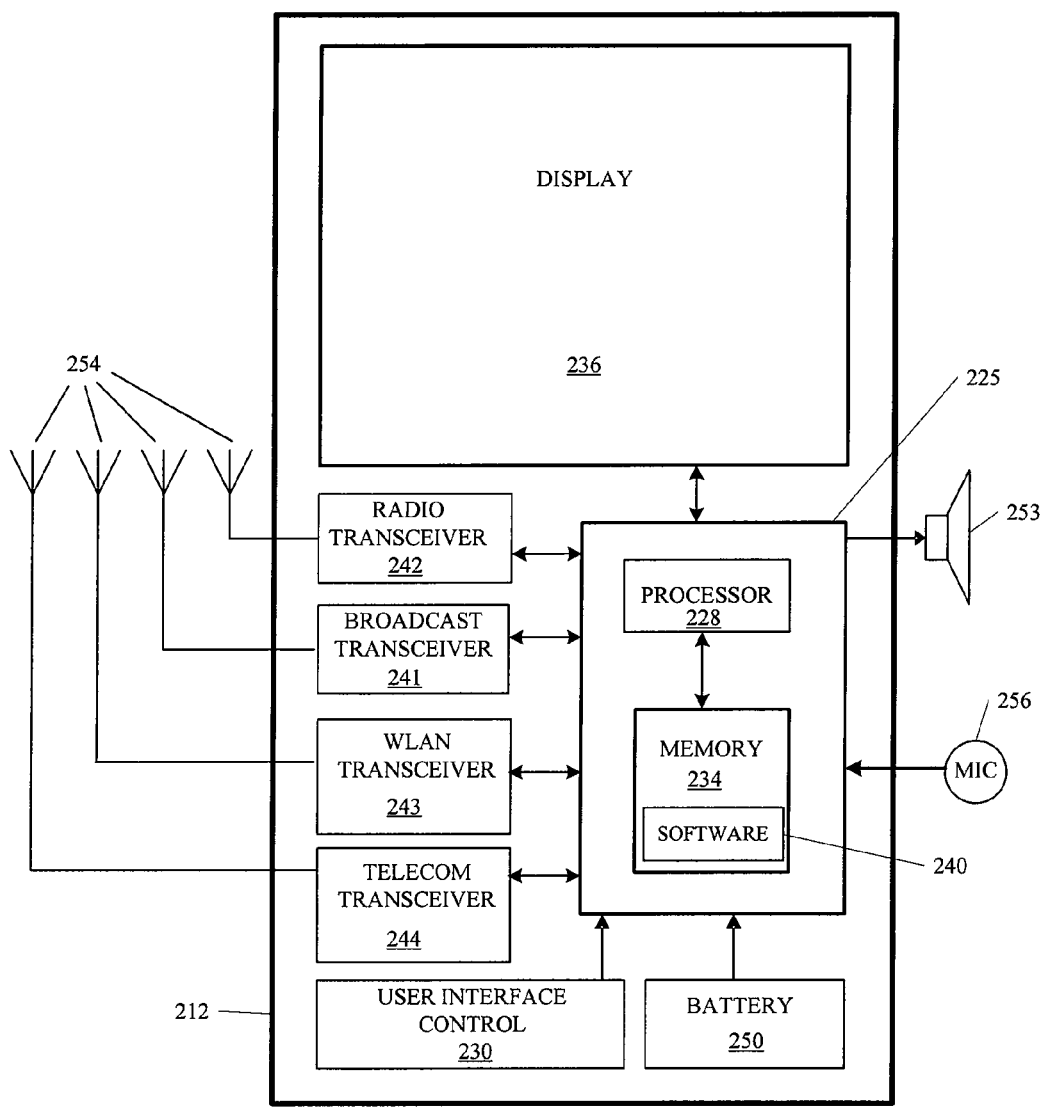
FIG. 2 is a block diagram of an example communication device according to one or more aspects described herein.

FIG. 2 illustrates an example computing device such as mobile device 212 that may be used in a communication network such as those illustrated in FIGS. 1A-1C. Mobile device 212 may include a controller 225 connected to a user interface control 230, display 236 and other elements as illustrated. Controller 225 may include one or more processors 228 and memory 234 storing software 240, for example client software 165 and/or user interface software. Mobile device 212 may also include a battery 250, speaker 253 and antenna 254. The mobile device 212 may include user interface circuitry, such as user interface control 230. User interface control 230 may include controllers or adapters, and other circuitry, configured to receive input from or provide output to a keypad, touch screen, voice interface—for example via microphone 256, function keys, joystick, data glove, mouse and the like. The user interface circuitry and user interface software may be configured to facilitate user control of at least some functions of the mobile phone though use of a display. Display 236 may be configured to display at least a portion of a user interface of the mobile phone. Additionally, the display may be configured to facilitate user control of at least some functions of the mobile phone Computer executable instructions and data used by processor 228 and other components of mobile device 212 may be stored in a storage facility such as memory 234. Memory 234 may comprise any type or combination of read only memory (ROM) modules or random access memory (RAM) modules, including both volatile and nonvolatile memory such as disks. Software 240 may be stored within memory 234 to provide instructions to processor 228 such that when the instructions are executed, processor 228, mobile device 212 and/or other components of mobile device 212 are caused to perform various functions or methods such as those described herein. Software may include both applications and operating system software, and may include code segments, instructions, applets, pre-compiled code, compiled code, computer programs, program modules, engines, program logic, and combinations thereof. Computer executable instructions and data may further be stored on computer readable media including electrically erasable programmable read-only memory (EEPROM), flash memory or other memory technology, CD-ROM, DVD or other optical disk storage, magnetic cassettes, magnetic tape, magnetic storage and the like.

Mobile device 212 or its various components may be configured to receive, decode and process various types of transmissions including digital broadband broadcast transmissions that are based, for example, on the Digital Video Broadcast (DVB) standard, such as DVB-NGH, DVB-H, DVB-T2, DVB-H+ (hybrid satellite/terrestrial architecture), or Digital Video Broadcasting-Multimedia Home Platform (DVB-MHP), through a specific broadcast transceiver 241. Other digital transmission formats may alternatively be used to deliver content and information regarding availability of supplemental services. Additionally or alternatively, mobile device 212 may be configured to receive, decode and process transmissions through various transceivers, such as FM/AM Radio transceiver 242, wireless local area network (WLAN) transceiver 243, and telecommunications transceiver 244.

Although the above description of FIG. 2 generally relates to a mobile device, other devices or systems may include the same or similar components and perform the same or similar functions and methods. For example, a stationary computer (e.g., PC 115 of FIG. 1A) may include the components or a subset of the components described above and may be configured to perform the same or similar functions as mobile device 212 and its components.

Some digital video broadcasting protocols provide signaling information to allow for the discovery and reception of services and other data at an electronic device (e.g., mobile device 212 of FIG. 2). The signaling information may provide mapping information for various services to the link layer pipes (LLP) and physical layer pipes (PLP) used in the broadcast system network when transmitting data from a source (e.g., service provider 125 and/or content provider 130 of FIG. 1A) to a destination (e.g., device 110 of FIG. 1A). Link layer pipes may also be referred to as logical layer pipes. A service may include several components that together form the service. Components can be also shared between two or more different services. A typical example of a service that includes several components is a teletext service or other non-real time service which uses the same components for all channels from the same service provider. The shared non-real time service component may be transmitted in a dedicated PLP that is the same for all channels.

Audio/Video (A/V) content is another example of component transmission. For scalable video coding, a service may include audio, base layer video, and enhancement layer video. The base layer video may have lower resolution than the enhancement layer video. The AV components of each service might not be shared with other services, and may be sufficiently synchronous with each other to avoid problems at a receiver. The example embodiments permit transmission of multiple service components within the same PLP as well as different robustness levels for the components.

Figure 3:
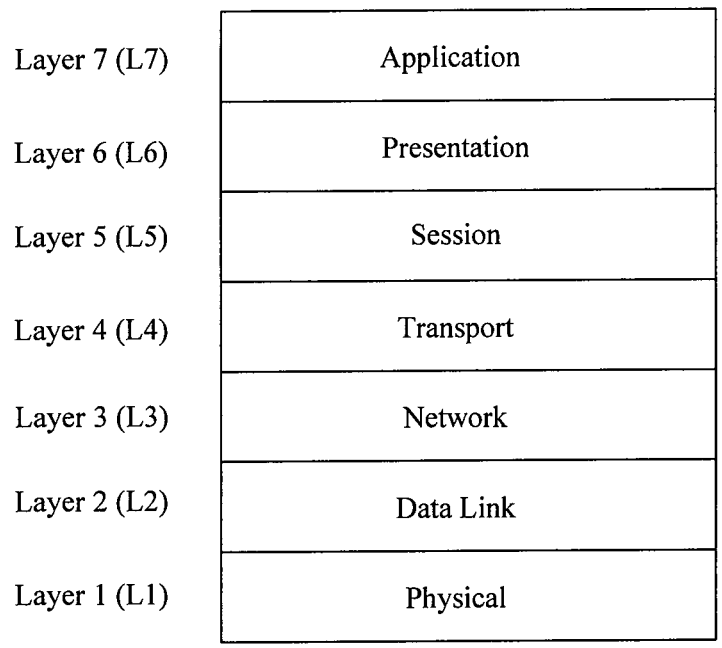
FIG. 3 illustrates an example data model for network transmissions according to one or more aspects described herein.

According to some digital video broadcasting protocols, components that make up a particular service like a content program or an interactive function are mapped through a PLP. A physical layer, as used herein, generally refers to a portion of a network protocol that is configured to define hardware-specific operations for effecting the transmission or reception of electronic signals over a data network. The physical layer is configured to facilitate the transmission of raw bits from a source to a destination. The physical layer may be configured to specify frequencies, voltages, bit rates and the like for transmission of data. The Open Systems Interconnection (OSI) Reference Model, for example, provides for a layered communication architecture including a physical layer. FIG. 3 illustrates one representation of an OSI Reference Model.

A PLP generally refers to a transmission channel between a source and a destination node defined at the physical layer level. The physical layer may define multiple channels—pipes—through which raw bits representative of the data such as broadcast data may be sent. For example, different broadcast services and data associated therewith may be mapped to different physical layer pipes and made available therethrough. Accordingly, the physical layer may be configured to identify the appropriate transmission channel for a series of bits corresponding to a particular service and transmit the data through the identified channel or pipe. In a broadcast arrangement, a PLP may be established between a source and multiple destinations. In one example, a PLP may correspond to a physical layer multiplexed channel that is carried by specified slices of a transmission stream (e.g., a DVB-T2 stream, which uses time-division multiplexing). When an end-user device wishes to access a component of a particular service, the end-user device may identify the corresponding PLP or PLPs and access the service data therethrough. In the broadcast scenario, a receiving device may listen for the particular PLP or PLPs carrying the desired service or services.

PLPs corresponding to components of a single service may be identified by combining PLPs into a logical grouping—into a link layer pipe—that is associated with a service. LLPs generally refer to logical associations such as mappings that link a service or service components to a PLP. LLPs may be defined using various data structures such as tables, lists and the like. PLPs may be identified for accessing components of a service by determining the logical grouping or LLP associated with that service and examining PLP parameters specified thereby. In one example, LLP may be identified in a service descriptor configured to advertise available services to network devices, such as mobile phones, computers and set-top boxes. LLP identification information may be carried in a packet header of the broadcast transmission stream. Alternatively or additionally, LLP information—for example LLP identifiers—for each service may be specified in electronic service guide data. Thus, upon receiving the packet header and/or electronic service guide data, a receiving device such as cell phone may extract LLP information to identify components of a service and their associated PLPs.

An LLP may comprise multiple frames, which may be used to allow for the fair division of resources in a broadcast transmission stream. Accordingly, a first frame of an LLP may be transmitted at time T1, while a second frame may be transmitted at time T2 and a third frame may be transmitted at time T3. The interval between the transmission of each frame in an LLP may be defined by a parameter (e.g., $T_{INT\_LLPF}$). The parameter may define the amount of time between two consecutive frames of a particular LLP. During the time between frames of an LLP, frames of other LLPs may be transmitted. Accordingly, transmission bandwidth and resources may be divided amongst multiple LLPs. LLP frames may vary in size from frame to frame. LLP frame size may be defined as $BS_{LLPF}$ (buffer size of LLP frame). This frame size may be, for example, the size of the largest LLP frame within an LLP. A receiver may determine whether it has buffering capacity to receive an entire LLP based on the $BS_{LLPF}$ and a time between two consecutive frames of a LLP, indicated for example by $T_{INT\_LLPF}$ as described above. Additionally or alternatively, $BS_{LLPF}$ may be required to be less than or equal to a specified size of the received buffer ($B_R$) for reception of a LLP.

Grouped PLPs for a particular LLP may be defined by specified slots or slices and packet sizes in a transmission stream. For example, a first PLP for an LLP might be defined as occupying the $1^{st}$, $5^{th}$, and $9^{th}$ slices in a payload portion of a T2 frame. PLPs may occupy different numbers of available slots or slices; for example, a PLP may be twice as large as another PLP and, therefore may occupy twice the number of available slots. A remainder of a T2 frame may be apportioned to header data and other LLP frames of other services.

In addition, an Electronic Service Guide (ESG) may be used to provide program or service related information. Generally, an Electronic Service Guide (ESG) enables a terminal to communicate what services are available to end users and how the services may be accessed. The ESG includes independently existing pieces of ESG fragments. Traditionally, ESG fragments include XML and/or binary documents, but more recently they have encompassed a vast array of items, such as for example, a SDP (Session Description Protocol) description, textual file, or an image. The ESG fragments describe one or several aspects of currently available (or future) service or broadcast program. Such aspects may include for example: free text description, schedule, geographical availability, price, purchase method, genre, and supplementary information such as preview images or clips. Audio, video and other types of data including the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. It can, however, be addressed to a group of users, commonly known as multicasting. In the case in which the data is addressed to all users it is called broadcasting.

ESG information, such as an ESG table, may include information on one or more services. The services may be Open Mobile Alliance Mobile Broadcast (OMA BCAST) services that may include one or more Internet Protocol (IP) streams and/or User Datagram Protocol (UDP) streams to transport components. Each service included in the ESG information may have a Global service identifier, which may be may be a unique identifier of the service. Each service may be associated with one or more components that may respectively transport audio, video, text, etc. Each component may be associated with a uniform resource identifier (URI) to identify information corresponding to the components of the desired service from service association information. In one example, using ESG information, service association information, and local multiplex information, a receiving device may identify a particular PLP carrying a component of a desired service. The details of this example will be described below. ESG information may be received via any type of bearer (for example, application, point-to-point, broadcast, etc.).

Figure 4A:
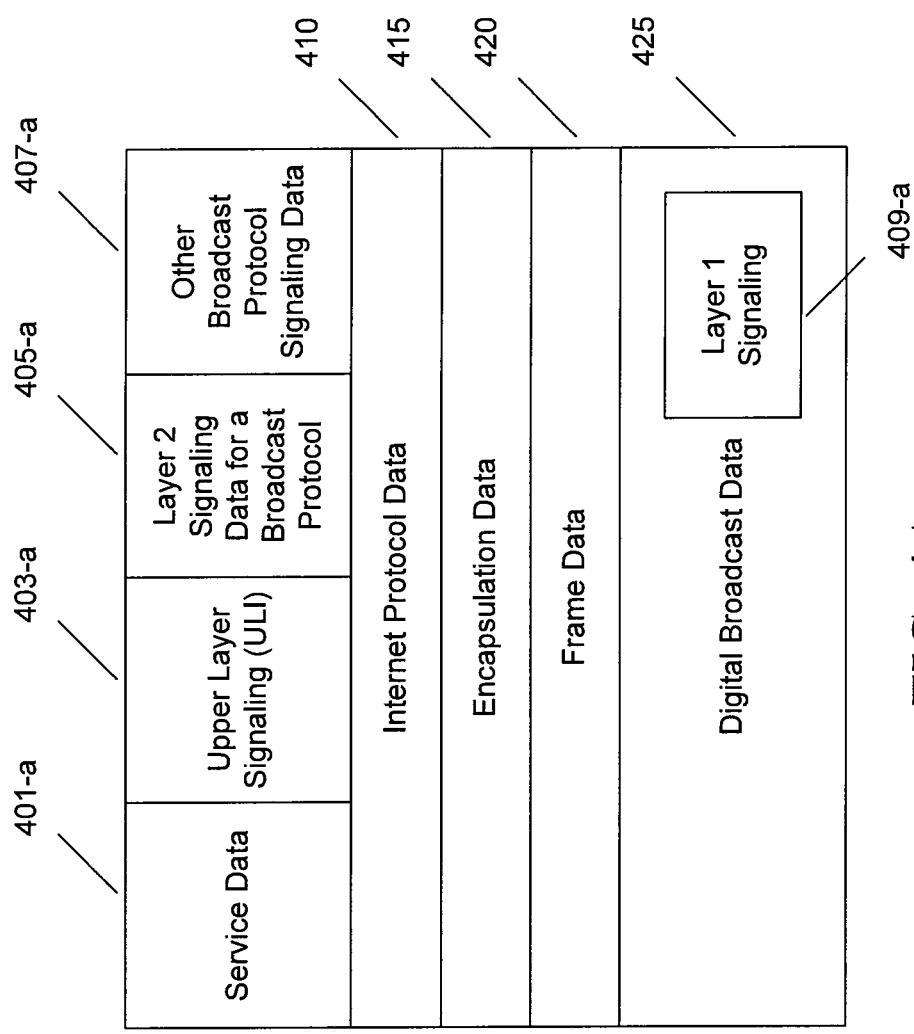
FIGS. 4A-4B illustrate example protocol stack of the signaling structures for a digital broadcast system according to one or more aspects described herein.
Figure 4B:
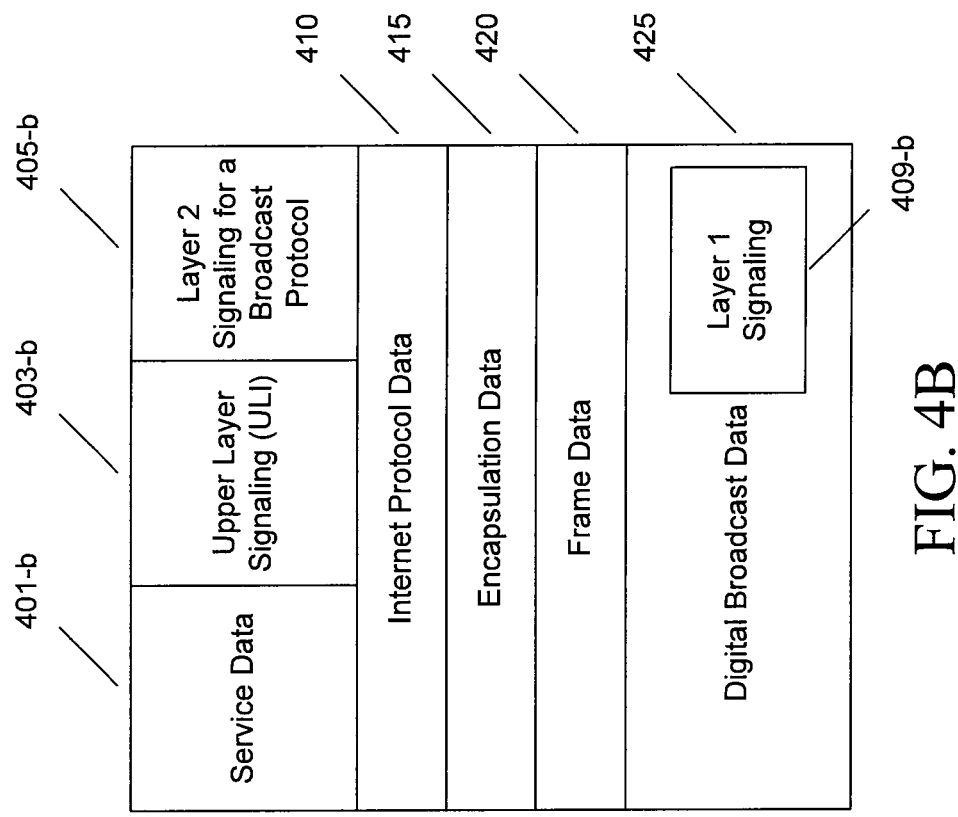

FIGS. 4A and 4B illustrate example protocol stack of the signaling structures for a digital broadcast system. The examples illustrated in FIGS. 4A and 4B may be used as protocol structures for a DVB-NGH system. DVB-NGH is an Internet Protocol based system that may be used to deliver content and services. DVB-NGH can be used in conjunction with other DVB broadcast systems, such as DVB-T2, DVB-T, DVB-H, etc. DVB-NGH may support broadcast delivery of services across different networks, and such support may include allowing for continuity of service. The data depicted in FIGS. 4A and 4B may be transmitted in one or more dedicated and/or dynamically allocated LLPs and may be transmitted in one or more dedicated and/or dynamically allocated PLPs, used by the system.

As illustrated in FIG. 4A, the example protocol stack includes service data 401-a, upper layer signaling (ULI) 403-a, layer 2 (L2) signaling data for a broadcast protocol (e.g., DVB-NGH) 405-a, and other broadcast protocol signaling data 407-a. The signaling data carried in the example protocol stack of FIG. 4A can include signaling specific to a particular system (e.g., DVB-NGH signaling in L2 signaling data 405-a) and signaling of other systems (e.g., DVB-H signaling, DVB-T signaling, DVB-T2 signaling, etc., in other broadcast protocol signaling data 407-a). In some embodiments, the service data 401-a, upper layer signaling 403-a, L2 signaling data 405-a, and other broadcast protocol signaling data 407-a may be carried with OSI layer 3 information. For example, the L2 signaling data may be carried on top of the Internet Protocol layer, which includes Internet Protocol data 410. Below the Internet Protocol layer may be data that includes encapsulation data 415, frame data 420 and digital broadcast data (e.g., DVB-NGH data) 425. Layer 1 (L1) signaling 409-a may be carried with the digital broadcast data 425.

In embodiments utilizing the example protocol stack illustrated in FIG. 4A, the signaling data for other systems included in other broadcast protocol signaling data 407-a may be allocated in dedicated and/or dynamically allocated IP addresses and ports. Additionally, the signaling data for the other systems can be transmitted in dedicated and/or dynamically allocated PLPs within a frame, such as a DVB-NGH frame.

FIG. 4B illustrates a protocol stack for a dedicated system (e.g., a system dedicated to DVB-NGH). As illustrated in FIG. 4B, the example protocol stack includes service data 401-b, upper layer signaling (ULI) 403-b, and L2 signaling data for the broadcast protocol (e.g., DVB-NGH) 405-b. In some embodiments, the service data 401-b, upper layer signaling 403-b, and L2 signaling data 405-b may be carried with OSI layer 3 information. For example, the L2 signaling data may be carried on top of the Internet Protocol layer, which includes Internet Protocol data 410. Below the Internet Protocol layer may be data that includes encapsulation data 415, frame data 420 and digital broadcast data (e.g., DVB-NGH data) 425. L1 signaling 409-*b* may be carried with the digital broadcast data 425.

Figure 5:
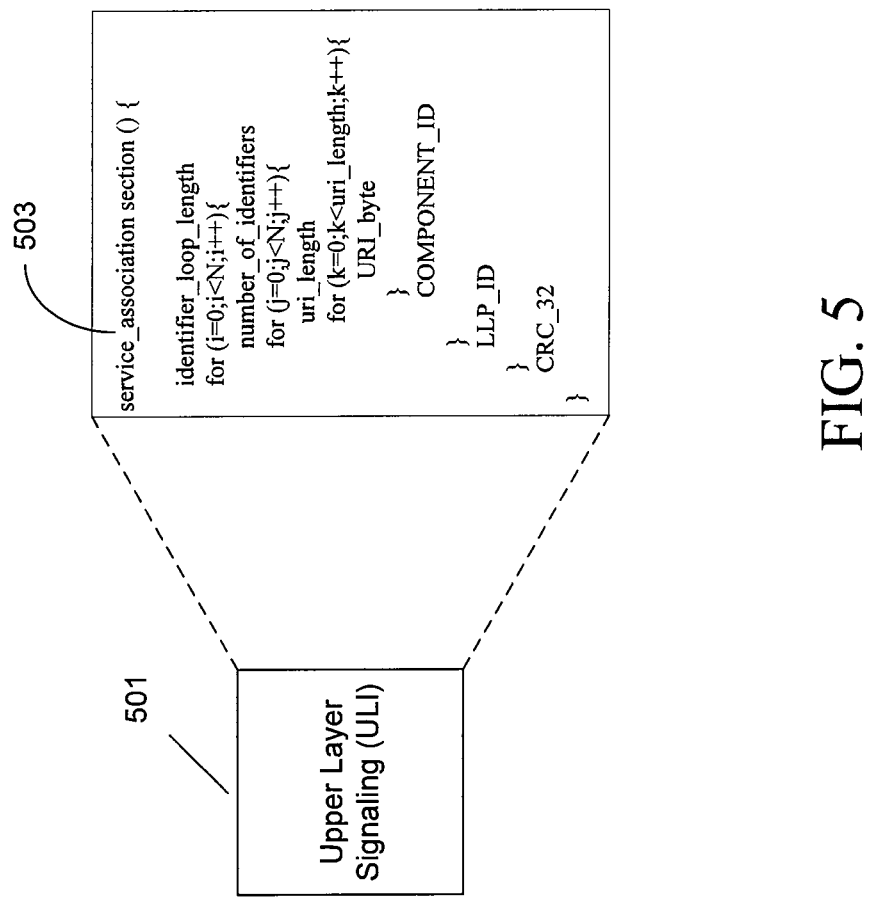
FIG. 5 depicts an example signaling structure for upper layer signaling in accordance with the examples shown in FIGS. 4A and 4B.

With respect to the upper layer information (ULI) of the illustrated example protocol stacks (e.g., ULI 403-*a* of FIG. 4A and ULI 403-*b* of FIG. 4B), the ULI can include information that maps services into the component identifiers for the services. Additionally, the upper layer information may include ESG specific signaling information and/or other upper layer transmission protocol data, such as data of protocols defined in OMA-BCAST. FIG. 5 depicts an example signaling structure for upper layer signaling in accordance with the example protocol stacks of FIGS. 4A and 4B. As illustrated in FIG. 5, upper layer information 501 (e.g., ULI 403-*a* of FIG. 4A, ULI 403-*b* of FIG. 4B) is represented by service_association section 503. Some embodiments of service_association section 503, as shown in FIG. 5, may incorporate a nested sequence of data elements that is represented by the loop pseudocode of FIG. 5. Other embodiments may incorporate a simplified structure in which the upper layer information 501 is represented by a section that is pre-defined (e.g., predefined length and section structure). In some embodiments, service_association section 503 may be a table and/or a part of a table, and may include information related to the table, such as a table identifier, table section information (e.g., a section length parameter), a table version number, a table section number, a previous section number, other data flags (e.g., a flag indicating whether the currently applicable table is the current or next version of the table), etc.

Referring to the information included within the service_association section 503, an identifier loop length parameter (e.g., identifier_loop_length) may be used for indicating a length of the loop that is located in the example service_association section 503 between identifier_loop_length and CRC_32. In one example, identifier_loop_length may be a 12 bit field. The N for the loop located between identifier_loop_length and CRC_32 may be the number of URI/COMPONENT_ID pairs.

A number of identifiers parameter (e.g., number_of_identifiers) may be used for indicating a length of the sub-section that is located in the example service_association section 503 between number_of_identifiers and LLP_ID. In one example, number_of_identifiers may identify the number of identifiers included within the sub-section between number_of_identifiers and LLP_ID.

A resource length parameter (e.g., uri_length) may be used for indicating a length of the sub-section that is located in the example service_association section 503 between uri_length and COMPONENT_ID. In one example, uri_length may be an 8-bit field that specifies the length in bytes of a URI.

A resource identifier parameter (e.g., a string of one or more URI_byte fields) may identify a service. In one example, URI_byte may be an 8-bit field, where a string of character (e.g., URI_char) fields specifies the URI identifying the service.

A component identifier (e.g., COMPONENT_ID) may identify a component of the service and may be used as a local index to identify other information in the local multiplex information.

A link layer pipe identifier (e.g., LLP_ID) may identify a LLP. In one example, LLP_ID may be a 16-bit field.

A cyclic redundancy check (CRC) parameter (e.g., CRC_32) may contain a CRC value for performing a redundancy check. In one example, CRC_32 may be a 32-bit field that contains the value that gives a zero output of the registers in the decoder.

Figure 6A:
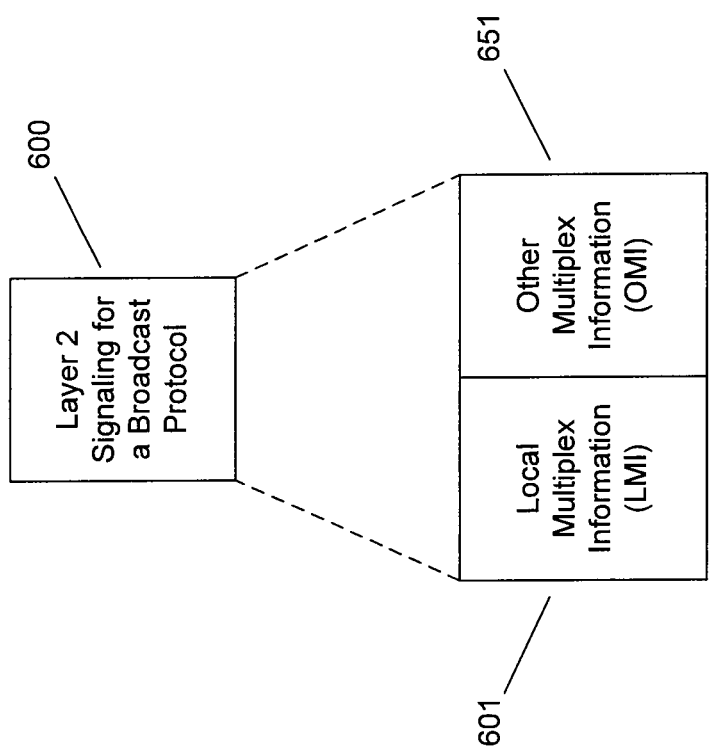
FIGS. 6A-6C depict example signaling structures for layer 2 signaling data in accordance with the examples shown in FIGS. 4A and 4B.

With respect to the L2 signaling data for a broadcast protocol of the illustrated example protocol stacks, the L2 signaling data can include data related to local multiplex information and other multiplex information. The L2 signaling data may include information that maps between services and multiplex information. In some embodiments, the included information may be similar to the information of PSI/SI signaling. Traditionally, PSI/SI signaling is carried with OSI Layer 2 information. In some embodiments, the L2 signaling data may be carried within OSI layer 3 (e.g., on top of the IP layer). FIG. 6A illustrates an example detailed view of L2 signaling data in accordance with the example protocol stacks of FIGS. 4A and 4B. As illustrated in FIG. 6A, the L2 signaling data 600 (e.g., L2 signaling data 405-*a* of FIG. 4A and L2 signaling data 405-*b* of FIG. 4B) may be divided into local multiplex information (LMI) 601 and other multiplex information (OMI) 651. LMI 601 may include information that maps the components to the PLP identifiers of the current multiplex. OMI 651 may include information that maps component identifiers, PLP identifiers and LLP identifiers with the multiplexes available within neighboring cells.

Figure 6B:
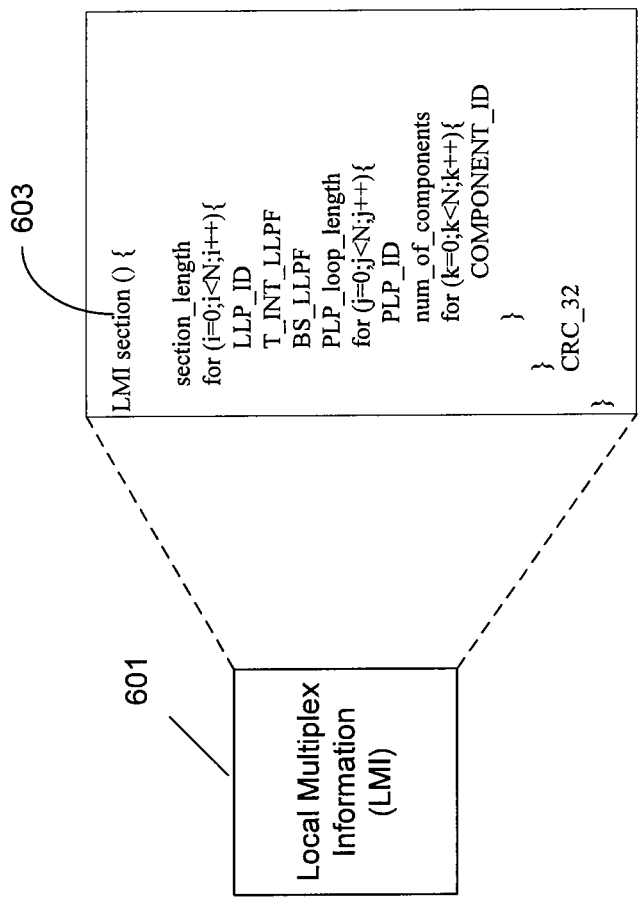

FIG. 6B illustrates an example signaling structure for local multiplex information in accordance with the example L2 signaling data of FIG. 6A. As illustrated in FIG. 6B, local multiplex information 601 is represented by LMI section 603. Some embodiments of LMI section 603, as shown in FIG. 6B, may incorporate a nested sequence of data elements that is represented by the loop pseudocode of FIG. 6B. Other embodiments may incorporate a simplified structure in which local multiplex information 601 is represented by a section that is pre-defined (e.g., predefined length and section structure).

Referring to the information included within the LMI section 603, a section length parameter (e.g., section_length) may be used for indicating a length of the sub-section that is located in the example LMI section 603 between section_length and CRC_32. In one example, section_length may indicate the number of LLPs.

A LLP identifier parameter (e.g., LLP_ID) may be used to identify each LLP. In one example, each LLP has a corresponding LLP_ID.

A time interval parameter (e.g., T_INT_LLPF) may be used to indicate the time between LLP frames in a transmission.

A maximum size parameter (e.g., BS_LLPF) may be used to indicate the size of the largest frame within an LLP.

A PLP loop length parameter (e.g., PLP_loop_length) may be used for indicating a length of the sub-section that is located in the example LMI section 603 beginning after PLP_loop_length.

A PLP identifier parameter (e.g., PLP_ID) may be used to identify a PLP. In one example, each PLP has a corresponding PLP_ID.

A number of components parameter (e.g., num_of_components) may indicate the number components associated with a particular PLP_ID.

Figure 6C:
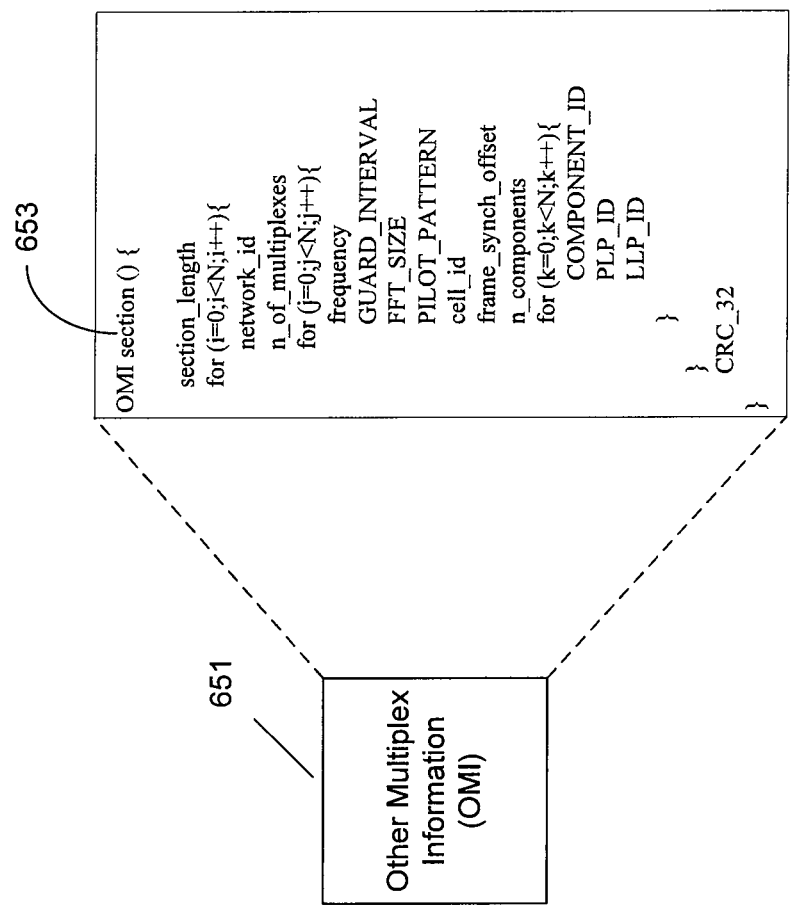

FIG. 6C illustrates an example signaling structure for other multiplex information 651 in accordance with the example L2 signaling data of FIG. 6A. As illustrated in FIG. 6C, other multiplex information 651 is represented by OMI section 653. Some embodiments of OMI section 653, as shown in FIG. 6C, may incorporate a nested sequence of data elements that is represented by the loop pseudocode of FIG. 5. Other embodiments may incorporate a simplified structure in which local multiplex information 651 is represented by a section that is pre-defined (e.g., predefined length and section structure).

Referring to the information included within the OMI section 653, a section length parameter (e.g., section_length) may be used for indicating a length of the sub-section that is located in the example OMI section 653 between section_length and CRC_32. In one example, section_length may indicate the number of neighboring networks.

A network identifier (e.g., network_id) may be used for identifying a network, such as a network associated with a neighboring cell.

A number of multiplexes parameter (e.g., n_of_multiplexes) may be used for indicating a length of the sub-section that is located in the example OMI section 653 beginning after n_of_multiplexes. In one example, n_of_multiplexes is dependent on the number of multiplexes (e.g., signals) available.

A frequency field (e.g., frequency) may be used for indicating a frequency of the multiplex (e.g., signal) covering an area of the associated cell. The indicated frequency may be the channel center frequency.

A guard interval field (e.g., GUARD_INTERVAL) may be used for indicating the guard interval of the current superframe of the associated multiplex (e.g., signal).

A fast fourier transfer (FFT) size parameter (e.g., FFT_SIZE) may be used for indicating the FFT size (e.g., 2K, 8K, etc.) of the associated multiplex.

A pilot pattern parameter (e.g., PILOT_PATTERN) may be used for indicating the pilot pattern of the signal. In one example, PILOT_PATTERN indicates the scattered pilot pattern used for the data Orthogonal Frequency Division Multiplexing (OFDM) symbols of the associated multiplex.

A cell identifier (e.g., cell_id) may be used for identifying a cell. In one example, each cell may be unique within one network.

A frame offset parameter (e.g., frame_synch_offset) may be used for indicating the frame offset between the physical layer frame transmitted within the current multiplex (e.g., the multiplex the receiving device is currently receiving) and the physical layer transmitted within the associated multiplex (e.g., a multiplex of the neighboring cell).

Figure 7:
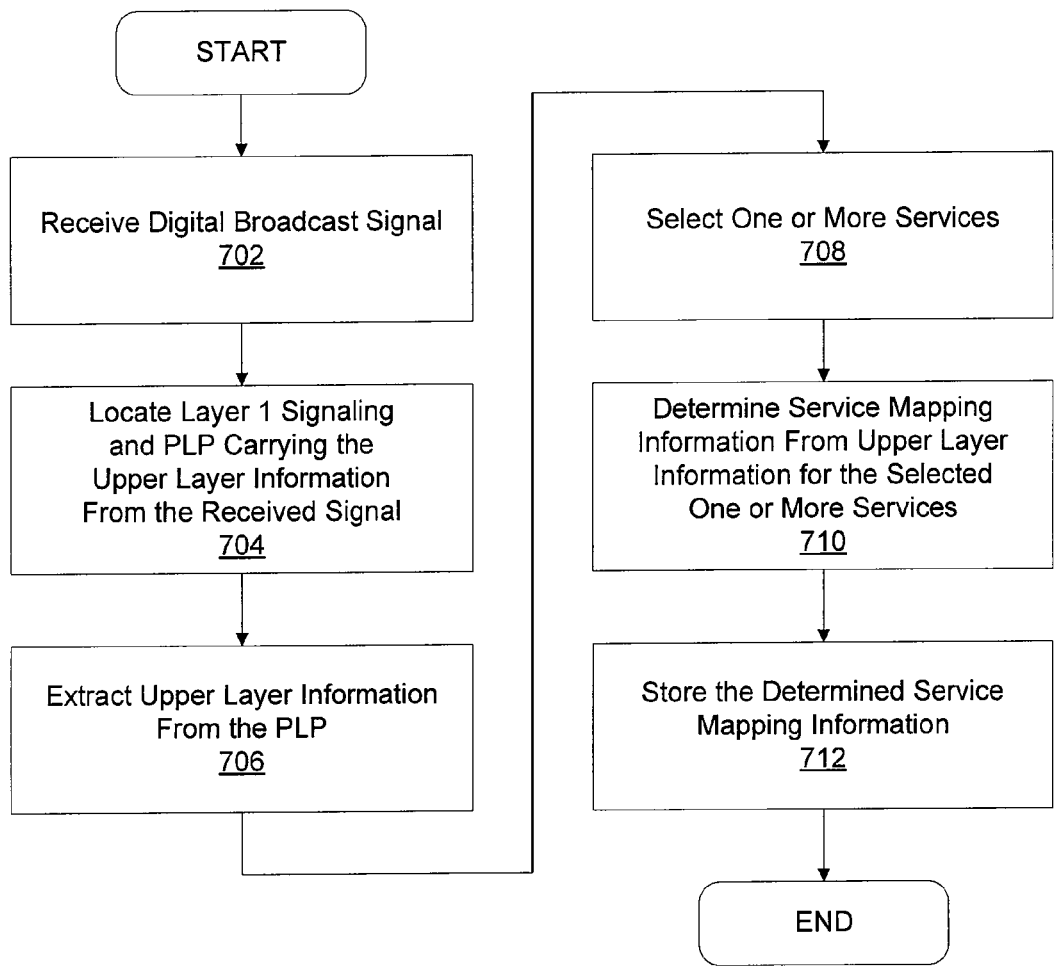
FIG. 7 illustrates an example method for processing layer 1 signaling and upper layer information according to one or more aspects described herein.
Figure 8:
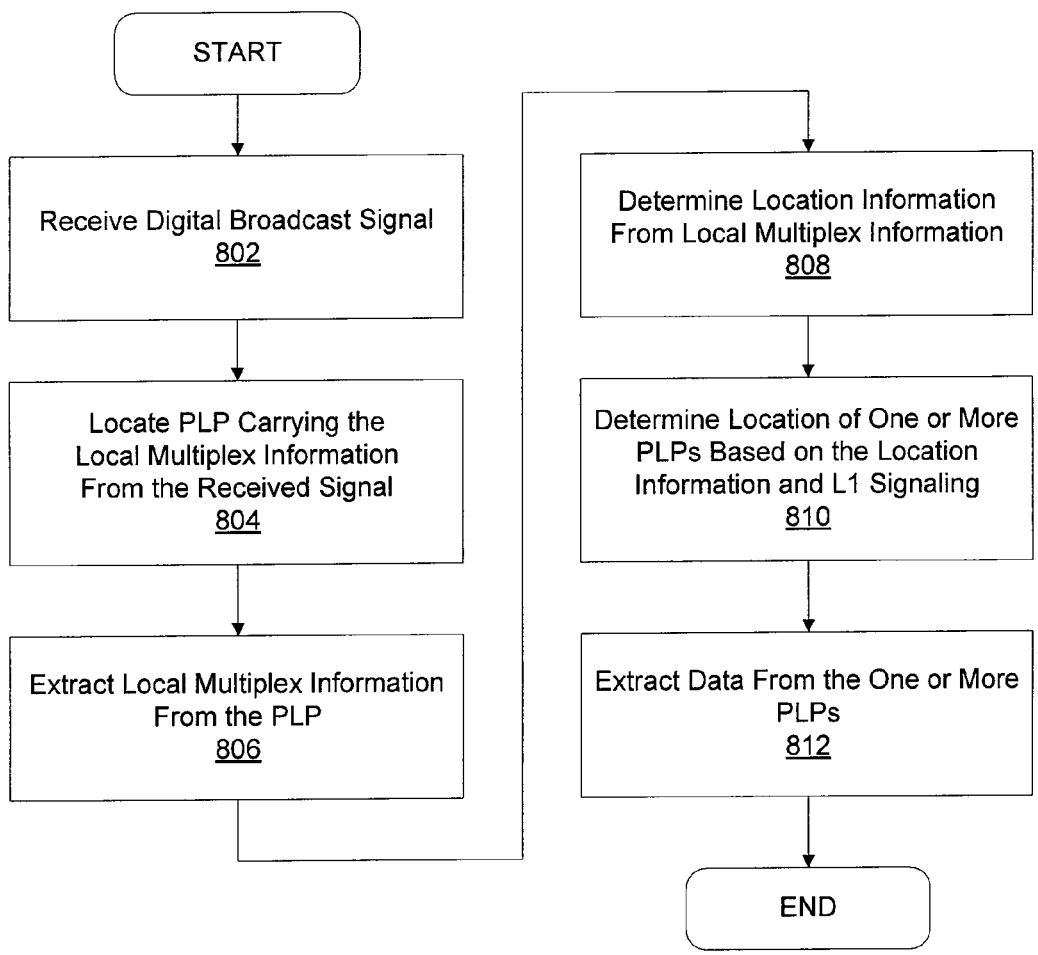
FIG. 8 illustrates an example method for processing local multiplex information according to one or more aspects described herein.

To locate the PLPs carrying data for consumption at an electronic device (e.g., video and/or audio components of a service for viewing, playback, etc.), processing of signaling parameters included in the upper layer information and local multiplex information may be performed. FIGS. 7 and 8 illustrate example methods for processing the upper layer information and local multiplex information, respectively. The methods may be implemented, for example, by a processor or other element in a receiving device, such as, but not limited to, mobile communication device 105, mobile phone 110, personal digital assistant (PDA) or mobile computer 120, and personal computer (PC) 115 depicted in FIG. 1A. The receiving device may begin processing the signaling data by performing the example process illustrated in FIG. 7.

FIG. 7 illustrates an example method for processing layer 1 signaling and upper layer information. At step 702, a digital broadcast signal (e.g. a DVB-NGH signal) may be received. At step 704, the layer 1 (L1) signaling and PLP carrying the upper layer information (ULI) may be located from the received signal. Upon locating the L1 signaling and the PLP carrying the ULI, the L1 signaling and ULI may be decoded from the signal. In some embodiments, the PLP carrying the upper layer information can be hard coded (e.g., a pre-determined PLP carries the ULI, etc.). In some embodiments, the PLP carrying the ULI may be signaled by a data parameter included in the signal, such as a PLP type parameter. The PLP carrying the ULI may contain additional signaling information.

At step 706, the ULI may be extracted from the PLP carrying the ULI. In some instances, this can include separating the ULI from the additional signaling information included in the PLP carrying the ULI. Additionally, extracting the ULI may include decapsulating the ULI from IP packets and/or decoding the ULI. In some embodiments, the ULI may be located for extraction from the PLP carrying the ULI using one or more dedicated IP addresses and/or ports. Alternatively, the one or more IP addresses and/or ports of the ULI may be provided within dedicated bootstrap information. In some examples, such bootstrap information may be located at the beginning of the PLP carrying the ULI.

At step 708, one or more services (e.g., the one or more desired services) may be selected. In one example, a service may be selected (e.g., by a user of the receiving device via a user interface). A service identifier (e.g., a URI) for the selected service may then be discovered. For example, a receiver may analyze ESG information, such as an ESG table, stored at the receiver to identify a URI for a desired service.

At step 710, service mapping information for the selected one or more services may be determined from the upper level information. For example, the upper level information (e.g., the service_association section 503 of FIG. 5) may be processed and/or decoded to determine the component identifiers (e.g., COMPONENT_IDs of FIG. 5) corresponding to the URI of the selected one or more services. In one instance, the component identifiers are identified by locating the component identifiers associated with a matching URI included in the upper level information. Each URI may be associated with one or more component identifiers. In some embodiments, each desired service may be associated with one or more components respectively transporting audio data, video data, text data, etc. Each URI may be associated with a similar number of component identifier (e.g., an identifier for each component of the desired service). Referring to the service_association section 503 of FIG. 5, a matching URI may be located in the service_association section 503 by locating a string of URI_bytes that match the desired URI. Referring again to step 710 of FIG. 7, as another example of service mapping information, the upper level information may be processed and/or decoded to determine LLP identifiers (e.g., LLP_ID of FIG. 5).

At optional step 712, the determined mapping information (e.g., the component identifiers and LLP identifiers determined in step 710) may be stored (e.g., in a memory of the receiving device) for later access.

Upon retrieving and/or storing the service mapping information, the receiving device may continue processing the signaling data by performing the example process illustrated in FIG. 8.

FIG. 8 illustrates an example method for processing local multiplex information. At step 802, a digital broadcast signal (e.g. a DVB-NGH signal) may be received. At step 804, the PLP carrying the local multiplex information (LMI) may be located from the received signal. Similar to the PLP carrying the ULI, the PLP carrying the LMI can be hard coded (e.g., a pre-determined PLP carries the LMI, etc.). In some embodiments, the PLP carrying the LMI may be signaled by a data parameter included in the signal, such as a PLP type parameter. The PLP carrying the LMI may contain additional signaling information. For example, the PLP carrying the LMI may also carry the ULI. The LMI may be separable from the additional signaling information based on IP layer information (e.g., the LMI and ULI may be provided using different IP addresses and/or ports).

At step 806, the LMI may be extracted from the PLP carrying the LMI. Similar to extraction of the ULI, in some instances, this can include separating the LMI from the additional signaling information included in the PLP carrying the LMI (e.g., separating the LMI from the ULI). Additionally, extracting the LMI may include decapsulating the LMI from IP packets and/or decoding the LMI. As also similar to the ULI, in some embodiments, the LMI may be provided using dedicated IP addresses and ports. Alternatively, the IP address and port of the LMI may be provided within dedicated bootstrap information. In some examples, such bootstrap information may be located at the beginning of the PLP carrying the LMI.

At step 808, location multiplex information may be determined from the local multiplex information. For example, the local multiplex information (e.g., the LMI section 603 of FIG. 6B) may be processed and/or decoded to determine the PLP identifiers (e.g., PLP_IDs of FIG. 6B) corresponding to the COMPONENT_IDs of the selected one or more services (e.g., the COMPONENTS_IDs determined in FIG. 7 from the ULI). In one instance, the PLP identifiers are identified by locating the PLP identifiers associated with a matching component identifier included in the local multiplex information. As another example, the local multiplex information may be processed and/or decoded to determine buffer information (e.g., T_INT_LLPF and BS_LLPF of FIG. 6B). In some embodiments, the buffer information may be identified from the LMI by locating the buffer information associated with a matching LLP identifier included in the LMI (e.g., an LLP_ID included in LMI section of FIG. 6B matching an LLP_ID determined in FIG. 7 from the ULI). In some embodiments, the location multiplex information (e.g., the buffer information and PLP identifiers) may be stored (e.g., in a memory of the receiving device) for later access.

At step 810, the location of one or more PLPs is determined based on the location multiplex information and L1 signaling. For example, the location multiplex information (e.g., the buffer information and PLP identifiers) and the L1 signaling (e.g., the L1 signaling extracted and stored in method illustrated by FIG. 7) may be used to identify the physical location of the PLP that corresponds to a component of the desired service(s). At step 812, upon locating the one or more PLPs, data of the desired service(s) from the one or more PLPs may be extracted and subsequently consumed (e.g., processed for viewing, playback, etc.) at the receiving device (or transmitted to another terminal for consumption at the terminal).

The receiving device may require a handover to be performed. In one example, the receiving device may initiate a handover from a first cell to a second cell. The receiver may attempt to continue receiving and/or consuming the desired service(s) currently being received and/or consumed by the receiving device. A handover procedure, in some embodiments, may include using information included in the other multiplex information (e.g., OMI 653 of FIG. 6A).

Figure 9:
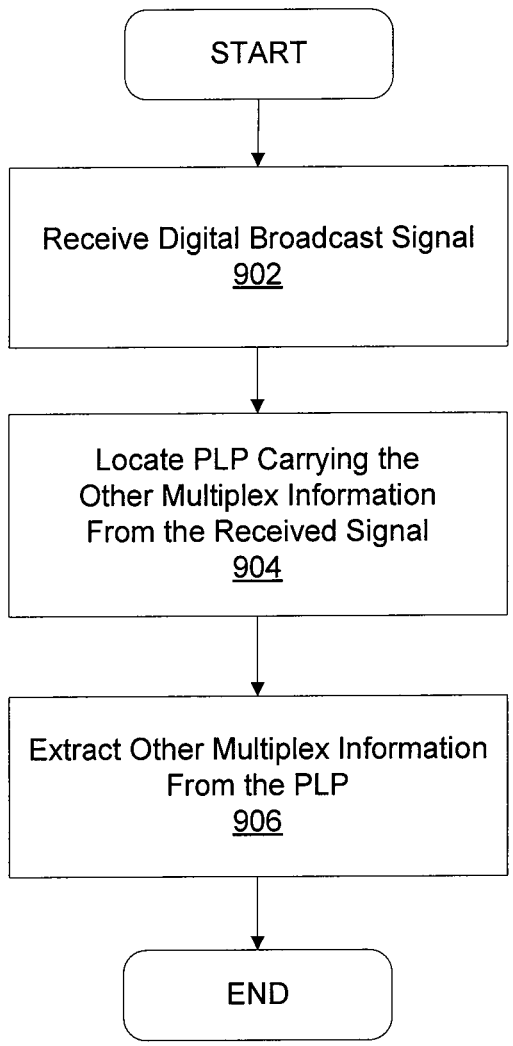
FIG. 9 illustrates an example method for processing other multiplex information according to one or more aspects described herein.

FIG. 9 illustrates an example method for processing other multiplex information. At step 902, a digital broadcast signal (e.g. a DVB-NGH signal) may be received. At step 904, the PLP carrying the other multiplex information (OMI) may be located from the received signal. Similar to the PLP carrying the ULI and/or the PLP carrying the LMI, the PLP carrying the OMI can be hard coded (e.g., a pre-determined PLP carries the OMI, etc.). In some embodiments, the PLP carrying the OMI may be signaled by a data parameter included in the signal, such as a PLP type parameter. The PLP carrying the OMI may contain additional signaling information. For example, the PLP carrying the LMI may also carry the ULI and/or the LMI. The OMI may be separable from the additional signaling information based on IP layer information (e.g., the LMI and ULI may be provided using different IP addresses and/or ports).

At step 906, the OMI may be extracted from the PLP carrying the OMI. Similar to extraction of the ULI and/or the LMI, in some instances, this can include separating the OMI from the additional signaling information included in the PLP carrying the OMI (e.g., separating the OMI from the ULI and/or the OMI). Additionally, extracting the OMI may include decapsulating the OMI from IP packets and/or decoding the OMI. As also similar to the ULI and/or LMI, in some embodiments, the OMI may be provided using dedicated IP addresses and ports. Alternatively, the IP address and port of the OMI may be provided within dedicated bootstrap information. In some examples, such bootstrap information may be located at the beginning of the PLP carrying the OMI. In some embodiments, the OMI (e.g., OMI section 653 of FIG. 6C) may be stored (e.g., in a memory of the receiving device) for later access.

Figure 10:
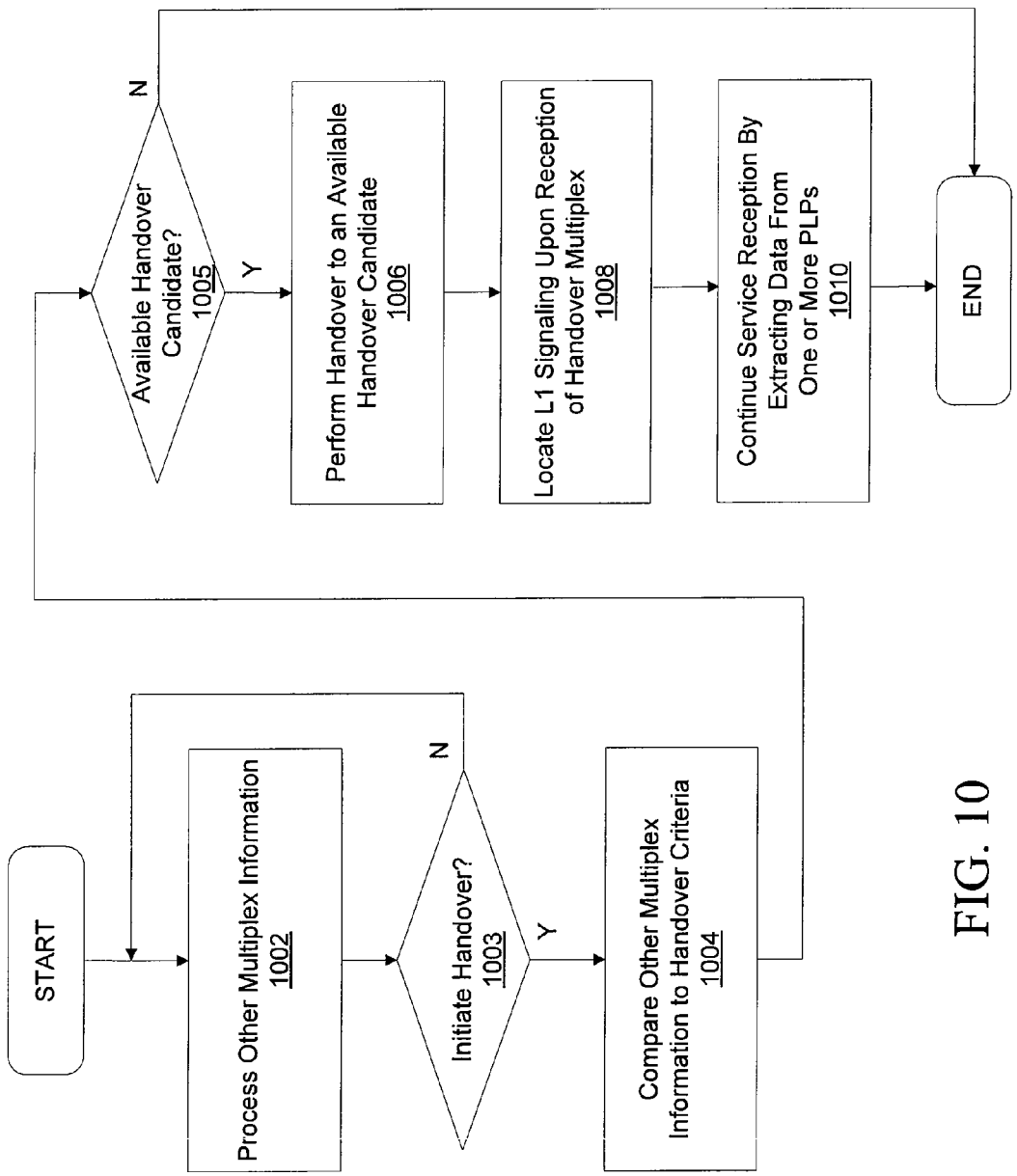
FIG. 10 illustrates an example method for performing a handover according to one or more aspects described herein.

FIG. 10 illustrates an example method for performing a handover. At step 1002, the other multiplex information may be processed. In some embodiments, this may proceed in a manner that is the same or similar to the method illustrated in FIG. 9. At step 1003, a determination may be made whether to initiate a handover. In some embodiments, a handover may be initiated based on one or more thresholds being reached, such as a signal strength threshold. In one example, a handover may be initiated when the receiving device moves from a first cell to a second cell of the network. If it is determined to initiate a handover, the handover may be initiated and the method may proceed to step 1004. Otherwise, the method may proceed to step 1002, where OMI information may be processed again. Such re-processing may include updating OMI information with updated OMI information and/or extracting new OMI information. For example, a new digital broadcast signal may be received that includes updated OMI information. The updated OMI information may be extracted (e.g., similar to the method illustrated in FIG. 9) and/or stored for later access.

At step 1004, a handover has been initiated and the OMI may be compared to handover criteria. The OMI may list one or more (e.g., some or all) components carried within the current multiplex (e.g., the multiplex, or signal, the receiving device is currently tuned to) and/or other multiplexes (e.g., the multiplexes not currently tuned to, but available to the device, such as multiplexes of neighboring cells or other multiplexes of the current cell). In one example, each multiplex may be included in the OMI and may have a respective list of components that are carried within the multiplex. Components listed in the OMI may use the same component identifiers as the component identifiers found in the ULI and/or the LMI (e.g., COMPONENT_IDs).

In some embodiments, the handover criteria may be one or more services currently being received and/or consumed by the receiving device. Additionally and/or alternatively, the handover criteria may include one or more services recently received and/or consumed by the receiving device, and/or may include one or more services predicted to be received and/or consumed by the receiving device (e.g., a prediction based on reception and/or consumption habits of a user at the receiving device). These services may be represented in the handover criteria by their component identifiers. Comparing the OMI to the handover criteria may include identifying one or more multiplexes of the OMI that include a listing of component identifiers that match the component identifiers of the handover criteria. In one instance, one or more multiplexes of the OMI may be identified by the comparison against handover criteria representing the services currently being received and/or consumed by the receiving device. In this instance, these identified multiplexes carry the services currently being received and/or consumed by the receiving device.

In some embodiments, the comparison may compare the handover criteria to every multiplex included in the OMI. In others, the comparison may compare the handover criteria until a first matching multiplex is identified in the OMI. In yet others, the comparison may compare the handover criteria until a threshold number (e.g., 2, 3, 4, etc.) of matching multiplexes are identified in the OMI. Addtitionally, the information for the identified matching multiplexes may be extracted from the OMI and/or stored for later access. For example, referring to the OMI section 653 of FIG. 6C, the various parameters associated with a particular matching multiplex may be extracted and/or stored. The extracted and/or stored parameters may include a network identifier (e.g., network_id of OMI section 653) of the matching multiplex, a frequency parameter (e.g., frequency of OMI section 653) of the matching multiplex, a guard interval parameter (e.g., GUARD_INTERVAL of OMI section 653) of the matching multiplex, a FFT size parameter (e.g., FFT_SIZE of OMI section 653) of the matching multiplex, a pilot pattern parameter (e.g., PILOT_PATTERN of OMI section 653) of the matching multiplex, a cell identifier (e.g., cell_id of OMI section 653) of the matching multiplex, a frame offset parameter (e.g., frame_synch_offset of OMI section 653) of the matching multiplex, the various component identifiers (e.g., COMPONENT_IDs of OMI section 653) of the matching multiplex, the various PLP identifiers corresponding to the component identifiers (e.g., PLP_IDs of OMI section 653) of the matching multiplex, and/or the various LLP identifiers corresponding to the component identifiers (e.g., LLP_IDs of OMI section 653) of the matching multiplex.

Referring again to FIG. 10, at step 1005, a determination is made whether there are any available handover candidate multiplexes. For example, if one or more multiplexes are identified in the OMI that match the handover criteria (e.g., there is at least one multiplex in the OMI that carries the services currently being received and/or consumed by the receiving device), it may be determined that there are available handover candidates. The process may then proceed to step 1006. Otherwise, the process may end and/or announce that there are not any available candidates. Such an announcement may include announcing that handover is not possible and/or that service disruption would result if handover is performed.

At step 1006, the handover to an available handover candidate multiplex is performed. The handover may include selecting a handover multiplex from the available handover candidate multiplexes and starting reception of the handover multiplex. In some instances, the handover multiplex may be a different frequency than the current multiplex. Selecting the handover multiplex may be performed in various ways, including, for example: selecting the first available candidate multiplex; selecting based on multiplex priority (e.g., multiplexes having certain parameter and/or identifier values, such as network identifier and/or cell identifier, may be given priority over other multiplexes having different parameter/identifier values); and/or selecting based on other criteria (e.g., signal strength of the available multiplexes). The handover may be performed using the information of the selected handover multiplex that was extracted from the OMI (e.g., the parameters and/or identifiers extracted from OMI section 653 of FIG. 6C). For example, a frame offset parameter may be used when starting the reception of a frame (e.g., a DVB-NGH frame) carried by the new multiplex. Use of the frame offset may, for example, enable the correct timing and/or prevent delay of the frame reception.

At step 1008, upon reception of a signal of the handover multiplex, the L1 signaling is located. The L1 signaling may then be extracted for use by the receiving device. In conjunction with the information for the handover multiplex extracted from the OMI (e.g., component identifiers, PLP identifiers, LLP identifiers, etc.), the L1 signaling may provide the receiving device the information needed locate and extract information from PLPs carrying the data for the desired services. In some embodiments, the receiving device may proceed immediately with locating and extracting information from the PLPs carrying the data for the desired services so that the receiving device may continue receiving and/or consuming the desired services. For example, there is no need to locate and process ULI and LMI information (e.g., the example methods illustrated in FIGS. 7 and 8), and those processes may be skipped and/or not performed.

At step 1010, reception of the desired services may be continued by extracting data from one or more PLPs of the desired service from the received signal of the handover multiplex. Extracting the data may include locating the one or more PLPs using the L1 signaling located in step 1008 and the information of the handover multiplex extracted from the OMI. For example, the one or more PLPs may be located (e.g., the physical location of the one or more PLPs may be determined) based on the L1 signaling, the component identifiers of the handover multiplex, the PLP identifiers of the handover multiplex, and/or the LLP identifiers of the handover multiplex.

Figure 11:
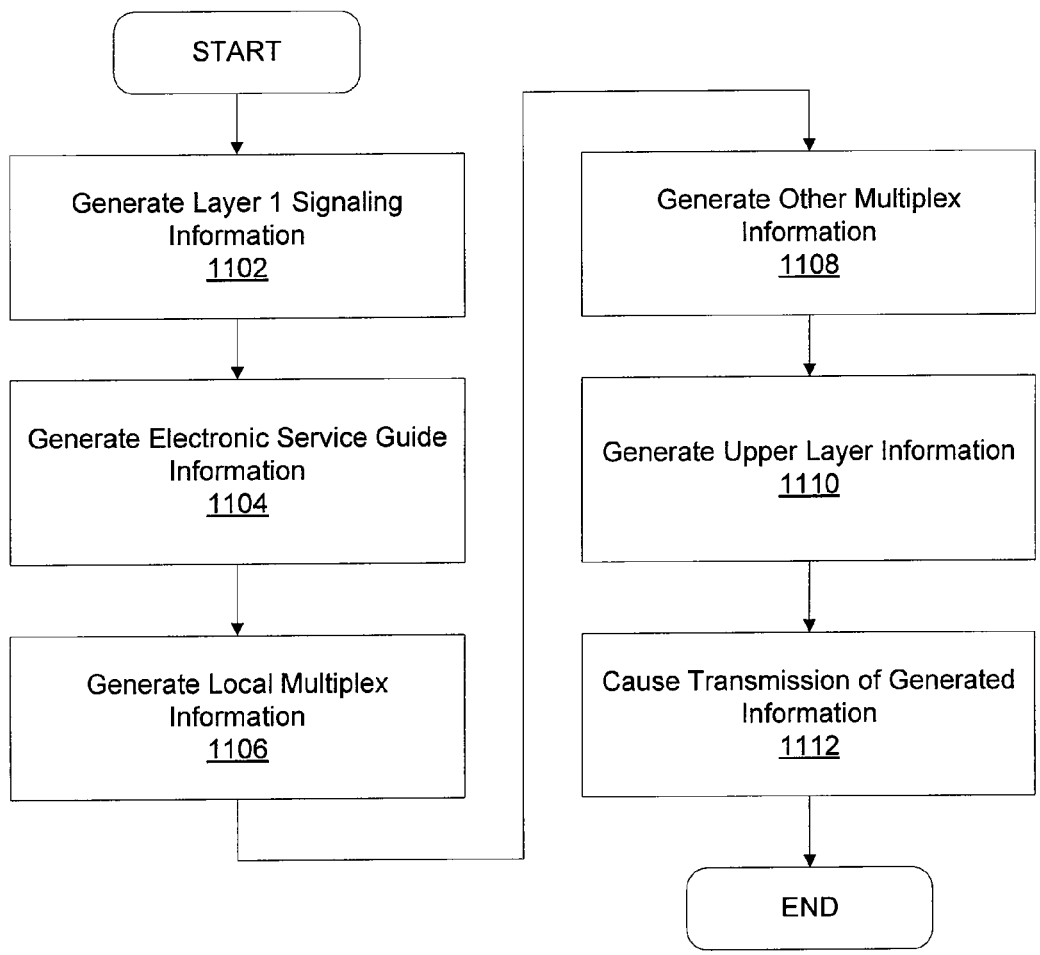
FIG. 11 illustrates an example method for communicating signaling parameters according to one or more aspects described herein.

FIG. 11 illustrates an example method for communicating signaling parameters. The example method of FIG. 11 may be implemented, for example, by a processor or other element, in one or more various devices and apparatuses of a content provider and/or a service provider (e.g., service provider 125 of FIG. 1A, content provider server 130 of FIG. 1A, digital content sources 104 of FIG. 1B, digital broadcast transmitter 103 of FIG. 1B, transmitter 101 of FIG. 1B, etc.). The various devices and apparatuses may include at least one processor and at least one memory. Additionally, the various devices and apparatuses may include receiving and/or transmitting elements for the sending and receiving of signals from the devices and apparatuses. At step 1102, L1 parameters may be generated that associates indexes, such as a PLP identifier, with a physical location. At step 1104, electronic service guide information that associates each service with a uniform resource identifier may be generated. At step 1106, local multiplex information may be generated that associates a component identifier with an index, such as a PLP identifier (e.g., information represented by the structure of LMI section 603 of FIG. 6B is generated).

At step 1108, other multiplex information may be generated that includes information related to one or more available multiplexes (e.g., information represented by the structure of OMI section 653 of FIG. 6C is generated). The information related to the one or more available multiplexes may include information for performing a handover to the available multiplex. Additionally, the information related to the one or more available multiplexes may include the indexes needed to access the physical location of data for one or more services (e.g., component identifiers, PLP identifiers and/or LLP identifiers).

At step 1110, upper layer information is generated that associates a uniform resource identifier with one or more component identifiers (e.g., information represented by the structure of service_association section 503 of FIG. 5 is generated). At step 1112, transmission of the L1 signaling information, the ESG information, the LMI, the OMI, and the ULI to a receiving device is caused to occur (e.g., the generated information is sent to a transmitter and/or transmitter antenna for transmission).

Any of the method steps, operations, procedures or functions described herein may be implemented using one or more processors and/or one or more memory in combination with executable instructions that cause the processors and other components to perform the method steps, procedures or functions. As used herein, the terms "processor"/"controller" and "computer" whether used alone or in combination with executable instructions stored in a memory or other computer-readable storage medium should be understood to encompass any of various types of well-known computing structures including but not limited to one or more microprocessors, special-purpose computer chips, field-programmable gate arrays (FPGAs), controllers, application-specific integrated circuits (ASICs), combinations of hardware/firmware/software, or other special or general-purpose processing circuitry.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

We claim:

1. A method comprising:
    receiving, at a computing device, a digital broadcast signal that includes layer 2 (L2) signaling information for a broadcast protocol, the L2 signaling information including local multiplex information and other multiplex information;
    locating a physical layer pipe (PLP) carrying the local multiplex information;
    locating a PLP carrying the other multiplex information;
    extracting the local multiplex information from the PLP carrying the local multiplex information;
    extracting the other multiplex information from the PLP carrying the other multiplex information;
    storing information related to at least one of the extracted local multiplex information and the extracted other multiplex information;
    comparing, upon initiation of a handover, the extracted other multiplex information to handover criteria;
    in response to comparing the extracted other multiplex information, determining that there is one or more available handover candidate multiplexes;
    in response to determining that there is the one or more available handover candidate multiplexes, performing the handover to a handover multiplex of the one or more available handover candidate multiplexes;
    upon performing the handover to the handover multiplex, locating layer 1 (L1) signaling from a second digital broadband signal received after completion of the handover; and
    extracting data from a PLP carrying data for a service based on the L1 signaling and information corresponding to the handover multiplex, wherein the extracted other multiplex information includes the information corresponding to the handover multiplex.

2. The method of claim 1, further comprising:
    determining location multiplex information from the extracted local multiplex information, the location multiplex information including a PLP identifier;
    determining a location of a PLP carrying data of a service using the location multiplex information and L1 signaling information;
    based on the determined location, extracting data of the service from the PLP carrying the data of the service; and
    processing the extracted data of the service in accordance with the service.

3. The method of claim 1, wherein the service is a service carried by a multiplex the computing device tuned to before performance of the handover, wherein the handover changed the tuning of the computing device from the multiplex to the handover multiplex,
    wherein the handover criteria includes one or more component identifiers of the service, and
    wherein the comparing includes identifying one or more multiplexes of the other multiplex information that include a listing of component identifiers that match the one or more component identifiers of the handover criteria.

4. The method of claim 1, wherein the local multiplex information includes information mapping component identifiers to PLP identifiers, the local multiplex information is related to a multiplex currently tuned to by the computing device, and the other multiplex information includes information related to one or more multiplexes different than the multiplex currently tuned to by the computing device.

5. The method of claim 1, wherein the local multiplex information is related to a first multiplex of a first cell of a network, and the other multiplex information is related to a second multiplex of a second cell of the network and includes at least one of a frequency parameter of the second multiplex, a guard interval parameter of the second multiplex, a pilot pattern parameter of the second multiplex, a cell identifier of the second multiplex, one or more component identifiers of the second multiplex, one or more PLP identifiers of the second multiplex, and one or more link layer pipe (LLP) identifiers of the second multiplex.

6. The method of claim 1, wherein the broadcast protocol is Digital Video Broadcasting-Next Generation Handheld (DVB-NGH) and the L2 signaling information is carried within Open Systems Interconnection (OSI) layer 3.

7. One or more non-transitory computer readable media storing computer readable instructions that, when executed, cause an apparatus to at least:
  receive a digital broadcast signal that includes layer 2 (L2) signaling information for a broadcast protocol, the L2 signaling information including local multiplex information and other multiplex information;
  locate a physical layer pipe (PLP) carrying the local multiplex information;
  locate a PLP carrying the other multiplex information;
  extract the local multiplex information from the PLP carrying the local multiplex information;
  extract the other multiplex information from the PLP carrying the other multiplex information;
  store information related to at least one of the extracted local multiplex information and the extracted other multiplex information;
  compare, upon initiation of a handover, the extracted other multiplex information to handover criteria;
  in response to comparing the extracted other multiplex information, determine that there is one or more available handover candidate multiplexes;
  in response to determining that there is the one or more available handover candidate multiplexes, perform the handover to a handover multiplex of the one or more available handover candidate multiplexes;
  upon performing the handover to the handover multiplex, locate layer 1 (L1) signaling from a second digital broadband signal received after completion of the handover; and
  extract data from a PLP carrying data for a service based on the L1 signaling and information corresponding to the handover multiplex, wherein the extracted other multiplex information includes the information corresponding to the handover multiplex.

8. The one or more non-transitory computer readable media of claim 7 further storing computer readable instructions that, when executed, cause the apparatus to:
  determine location multiplex information from the extracted local multiplex information, the location multiplex information including a PLP identifier;
  determine a location of a PLP carrying data of a service using the location multiplex information and L1 signaling information;
  based on the determined location, extract data of the service from the PLP carrying the data of the service; and
  process the extracted data of the service in accordance with the service.

9. The one or more non-transitory computer readable media of claim 7, wherein the service is a service carried by a multiplex a computing device tuned to before performance of the handover, wherein the handover changed the tuning of the computing device from the multiplex to the handover multiplex,
  wherein the handover criteria includes one or more component identifiers of the service, and
  wherein the comparing includes identifying one or more multiplexes of the other multiplex information that include a listing of component identifiers that match the one or more component identifiers of the handover criteria.

10. The one or more non-transitory computer readable media of claim 7, wherein the local multiplex information includes information mapping component identifiers to PLP identifiers, the local multiplex information is related to a multiplex currently tuned to by a computing device, and the other multiplex information includes information related to one or more multiplexes different than the multiplex currently tuned to by the computing device.

11. The one or more non-transitory computer readable media of claim 7, wherein the local multiplex information is related to a first multiplex of a first cell of a network, and the other multiplex information is related to a second multiplex of a second cell of the network and includes at least one of a frequency parameter of the second multiplex, a guard interval parameter of the second multiplex, a pilot pattern parameter of the second multiplex, a cell identifier of the second multiplex, one or more component identifiers of the second multiplex, one or more PLP identifiers of the second multiplex, and one or more link layer pipe (LLP) identifiers of the second multiplex.

12. An apparatus comprising:
  at least one processor; and
  at least one memory storing machine executable instructions, the machine executable instructions configured to, with the at least one processor, cause the apparatus to at least:
    receive a digital broadcast signal that includes layer 2 (L2) signaling information for a broadcast protocol, the L2 signaling information including local multiplex information and other multiplex information;
    locate a physical layer pipe (PLP) carrying the local multiplex information;
    locate a PLP carrying the other multiplex information;
    extract the local multiplex information from the PLP carrying the local multiplex information;
    extract the other multiplex information from the PLP carrying the other multiplex information;
    store information related to at least one of the extracted local multiplex information and the extracted other multiplex information;
    compare, upon initiation of a handover, the extracted other multiplex information to handover criteria;
    in response to comparing the extracted other multiplex information, determine that there is one or more available handover candidate multiplexes;
    in response to determining that there is the one or more available handover candidate multiplexes, perform the handover to a handover multiplex of the one or more available handover candidate multiplexes;
    upon performing the handover to the handover multiplex, locate layer 1 (L1) signaling from a second digital broadband signal received after completion of the handover; and
    extract data from a PLP carrying data for a service based on the L1 signaling and information corresponding to the handover multiplex, wherein the extracted other multiplex information includes the information corresponding to the handover multiplex.

13. The apparatus of claim 12, wherein the at least one memory further stores machine executable instructions configured to, with the at least one processor, cause the apparatus to:

determine location multiplex information from the extracted local multiplex information, the location multiplex information including a PLP identifier;

determine a location of a PLP carrying data of a service using the location multiplex information and L1 signaling information;

based on the determined location, extract data of the service from the PLP carrying the data of the service; and process the extracted data of the service in accordance with the service.

14. The apparatus of claim 12, wherein the service is a service carried by a multiplex the apparatus tuned to before performance of the handover, wherein the handover changed the tuning of the apparatus from the multiplex to the handover multiplex, wherein the handover criteria includes one or more component identifiers of the service, and wherein the comparing includes identifying one or more multiplexes of the other multiplex information that include a listing of component identifiers that match the one or more component identifiers of the handover criteria.

15. The apparatus of claim 12, wherein the local multiplex information includes information mapping component identifiers to PLP identifiers, the local multiplex information is related to a multiplex currently tuned to by the apparatus, and the other multiplex information includes information related to one or more multiplexes different than the multiplex currently tuned to by the apparatus.

16. The apparatus of claim 12, wherein the local multiplex information is related to a first multiplex of a first cell of a network, and the other multiplex information is related to a second multiplex of a second cell of the network and includes at least one of a frequency parameter of the second multiplex, a guard interval parameter of the second multiplex, a pilot pattern parameter of the second multiplex, a cell identifier of the second multiplex, one or more component identifiers of the second multiplex, one or more PLP identifiers of the second multiplex, and one or more link layer pipe (LLP) identifiers of the second multiplex.

17. The apparatus of claim 12, wherein the apparatus is a mobile phone further comprising:

a display; and a user interface configured to facilitate user control of at least some functions of the mobile phone through use of the display and configured to respond to user inputs, wherein the display is configured to display at least a portion of the user interface.

\* \* \* \* \*